US012556599B2

(12) United States Patent
Gao et al.

(10) Patent No.: US 12,556,599 B2
(45) Date of Patent: Feb. 17, 2026

(54) USER EXPERIENCE BY ISSUING LOWER BITRATE PROACTIVELY

(71) Applicant: QUALCOMM Incorporated, San Diego, CA (US)

(72) Inventors: Jian Gao, Shanghai (CN); Bing Leng, Shanghai (CN); Yong Hou, Beijing (CN); Sanjeev Mittal, San Diego, CA (US); Yong Xie, San Diego, CA (US); Vikram Singh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/696,430

(22) PCT Filed: Nov. 20, 2021

(86) PCT No.: PCT/CN2021/131958
§ 371 (c)(1),
(2) Date: Mar. 28, 2024

(87) PCT Pub. No.: WO2023/087291
PCT Pub. Date: May 25, 2023

(65) Prior Publication Data
US 2024/0380808 A1     Nov. 14, 2024

(51) Int. Cl.
*H04N 19/00* (2014.01)
*H04L 65/75* (2022.01)
(Continued)

(52) U.S. Cl.
CPC ............ *H04L 65/80* (2013.01); *H04L 65/762* (2022.05); *H04N 19/115* (2014.11);
(Continued)

(58) Field of Classification Search
CPC ..... H04L 65/80; H04L 65/762; H04N 19/115; H04N 19/164; H04N 19/184;
(Continued)

(56) References Cited

U.S. PATENT DOCUMENTS 7,538,764 B2 *  5/2009  Salomie .................. G06T 17/20
                                                                     380/232
10,638,130 B1 *  4/2020  Alakuijala ........... H04N 19/137
(Continued)

FOREIGN PATENT DOCUMENTS

WO     2013127459 A1    9/2013
WO     2017030657 A1    2/2017

OTHER PUBLICATIONS

International Search Report and Written Opinion—PCT/CN2021/131958—ISA/EPO—May 13, 2022.

*Primary Examiner* — Frank F Huang
(74) *Attorney, Agent, or Firm* — Harrity & Harrity, LLP

(57) ABSTRACT

Wireless communications systems and methods related to video telephony are provided. A device may proactively reduce the bitrate at which video is encoded at the beginning of a video call based on one or more radio metrics. Radio metrics used may include received signal strength indicator (RSSI), received signal received quality (RSRQ), received signal received power (RSRP), signal to noise ratio (SNR), power headroom (PHR), and block error rate (BER). The proactive reduction in bitrate is done prior to transmitting or receiving video data. The device may also request that a second device which is transmitting video do so at a reduced bitrate.

30 Claims, 6 Drawing Sheets

(51) Int. Cl.
*H04L 65/80* (2022.01)
*H04N 19/115* (2014.01)
*H04N 19/164* (2014.01)
*H04N 19/184* (2014.01)
*H04W 28/02* (2009.01)
*H04W 28/04* (2009.01)

(52) U.S. Cl.
CPC ......... *H04N 19/164* (2014.11); *H04N 19/184* (2014.11); *H04W 28/0236* (2013.01); *H04W 28/04* (2013.01)

(58) Field of Classification Search
CPC ........ H04N 21/2402; H04N 21/23805; H04W 28/0236; H04W 28/04
See application file for complete search history.

(56) References Cited

U.S. PATENT DOCUMENTS

| | | | |
|---|---|---|---|
| 2004/0125103 A1* | 7/2004 | Kaufman | G06T 15/08 345/419 |
| 2009/0252431 A1* | 10/2009 | Lu | H04N 19/172 382/255 |
| 2009/0295800 A1* | 12/2009 | Vetter | G06T 15/08 345/424 |
| 2013/0163430 A1 | 6/2013 | Gell et al. | |
| 2014/0192904 A1* | 7/2014 | Rosewarne | H04N 19/60 375/240.29 |
| 2018/0343449 A1* | 11/2018 | Amer | G06T 5/70 |
| 2019/0075301 A1* | 3/2019 | Chou | H04N 19/132 |
| 2019/0272616 A1* | 9/2019 | Lee | G06T 3/16 |
| 2019/0281293 A1* | 9/2019 | Lin | H04N 19/86 |
| 2020/0092602 A1 | 3/2020 | Oh et al. | |

* cited by examiner

USER EXPERIENCE BY ISSUING LOWER BITRATE PROACTIVELY

CROSS-REFERENCE TO RELATED APPLICATIONS

The present application is a 35 U.S.C. 371 National Phase entry of Patent Cooperation Treaty (PCT) Application No. PCT/CN2021/131958, filed Nov. 20, 2021, which is hereby expressly incorporated herein by reference in its entirety.

TECHNICAL FIELD

This application relates to wireless communication devices, systems, and methods, and more particularly to devices, systems, and methods for manipulating bitrate in video telephony to improve the user experience.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G), designed to provide a lower latency, a higher bandwidth or a higher throughput, and a higher reliability than LTE. Wireless communication systems are often used for two-way video communication (video telephony). Many systems adapt the bit rate of video communication when video packets are delayed or dropped in order to improve overall video quality. By waiting for information about the video stream itself in order to adapt the bit rate, the video quality may suffer at the beginning of a video call. Therefore, there exists a need for improved methods of determining and configuring video bitrates to avoid degraded video quality throughout a video call.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to one aspect of the present disclosure, a method of wireless communication, comprises receiving, by a first wireless communication device, an indication of a maximum bit rate (MBR) associated with a communication channel. The method further comprises receiving, by the first wireless communication device, an indication of an Application-Specific maximum bandwidth (AS) associated with an application. The method further comprises measuring, by the first wireless communication device, a radio metric associated with the communication channel. The method further comprises configuring, by the first wireless communication device before transmitting a video data, an encoder with a transmit bit rate lower than the MBR and lower than the AS based on the radio metric. The method further comprises transmitting, by the first wireless communication device to a second wireless communication device, the video data at the transmit bit rate.

According to another aspect of the present disclosure, a first wireless communication device comprises a transceiver configured to receive an indication of a maximum bit rate (MBR) associated with a communication channel. The transceiver is further configured to receive an indication of an Application-Specific maximum bandwidth (AS) associated with an application. The transceiver is further configured to measure a radio metric associated with the communication channel. The first wireless communication device further comprises a processor configured to configure, before transmitting a video data, an encoder with a transmit bit rate lower than the MBR and lower than the AS based on the radio metric. The transceiver is further configured to transmit, to a second wireless communication device, the video data at the transmit bit rate.

According to another aspect of the present disclosure, a non-transitory computer-readable medium having program code recorded thereon, the program code comprising code for causing a first wireless communication device to receive an indication of a maximum bit rate (MBR) associated with a communication channel, code for causing the first wireless communication device to receive an indication of an Application-Specific maximum bandwidth (AS) associated with an application code for causing the first wireless communication device to measure a radio metric associated with the communication channel, code for causing the first wireless communication device to configure, before transmitting a video data, an encoder with a transmit bit rate lower than the MBR and lower than the AS based on the radio metric, and code for causing the first wireless communication device to transmit, to a second wireless communication device, the video data at the transmit bit rate.

According to another aspect of the present disclosure, A first wireless communication device comprises means for receiving, by a first wireless communication device, an indication of a maximum bit rate (MBR) associated with a communication channel, means for receiving an indication of an Application-Specific maximum bandwidth (AS) associated with an application, means for measuring, by the first wireless communication device, a radio metric associated with the communication channel, means for configuring, by the first wireless communication device before transmitting a video data, an encoder with a transmit bit rate lower than the MBR and lower than the AS based on the radio metric, and means for transmitting, by the first wireless communication device to a second wireless communication device, the video data at the transmit bit rate.

Other aspects and features aspect of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
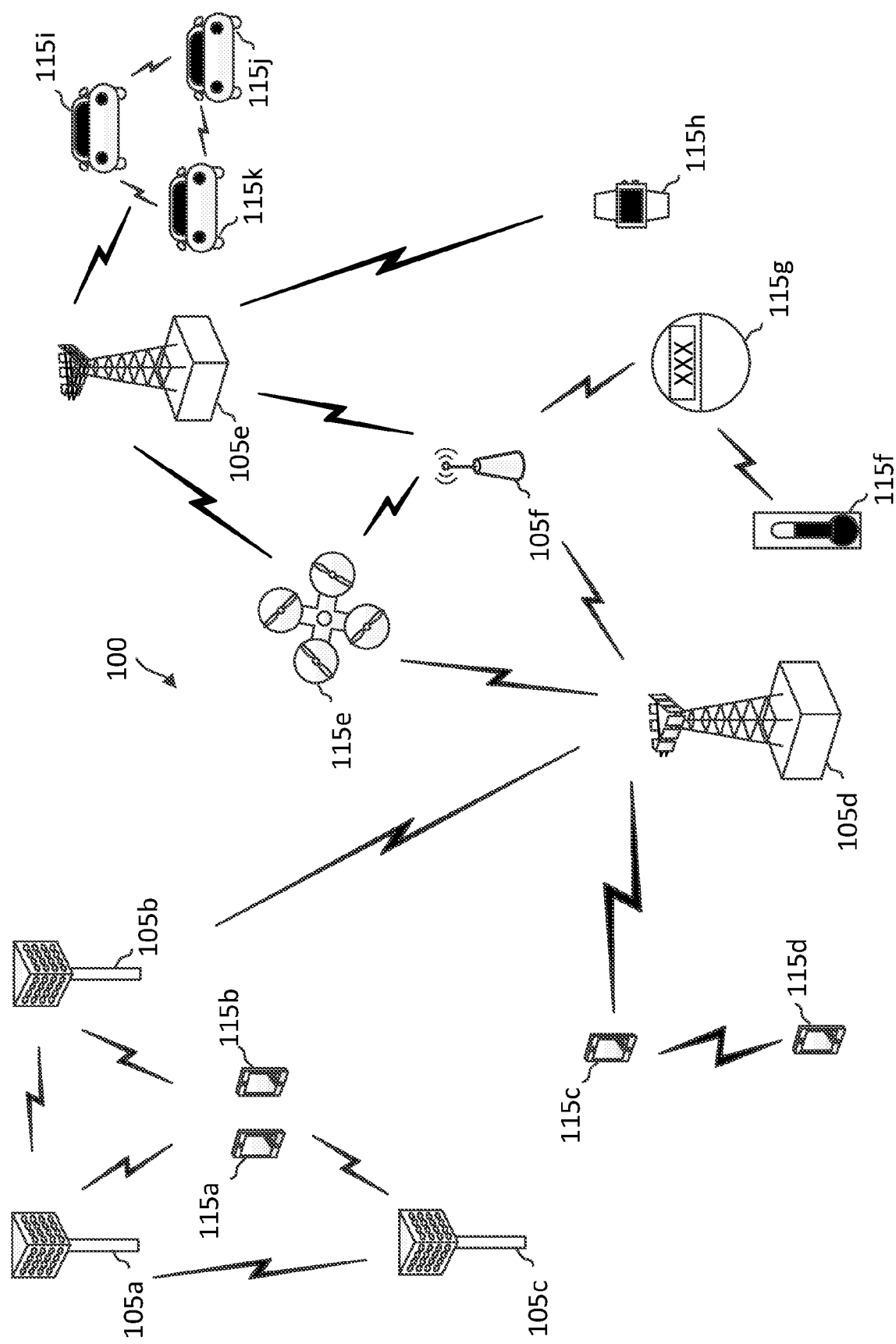
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 702.11, IEEE 702.16, IEEE 702.20, flash-OFDM and the like. UTRA, E-UTRA, and GSM are part of universal mobile telecommunication system (UMTS). In particular, long term evolution (LTE) is a release of UNITS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices.

Wireless networks such as those described above may be used for making video calls between devices. When a coder/decoder (CODEC) encodes video, it does so at a specific bitrate. The network may determine and indicate to the devices a maximum bitrate (MBR) that is allocated for the video call. The network may also indicate an application-specific maximum bandwidth (AS) associated with an application (e.g., the video call application). In some instances, the bitrate used is lower than the MBR and the AS at least temporarily, and is dynamically adjusted during the course of a video call based on the current performance. For example, if video packets are dropped at a rate that is determined to be too high due to worsening network conditions, the devices may drop the encoding bitrate lower than the MBR and the AS. Before video data is first communicated, however, there is a period of time where devices begin video communication using the lesser of the MBR and the AS. Depending on the network condition, this may cause video problems such as mosaicking, freezing, or jitter.

In some aspects of the present disclosure, a device may proactively reduce the bitrate at which video is encoded at the beginning of a call based on one or more radio metrics. Radio metrics used may include received signal strength indicator (RSSI), received signal received quality (RSRQ), received signal received power (RSRP), signal to noise ratio (SNR), power headroom (PHR), and block error rate (BER).

In one example, a device initiating a video call may receive a MBR (e.g, of 1000 kilobits per second (kbps) for sake of illustration) from the network, and an AS (e.g., of 1000 kbps). When configuring the encoding bitrate for the video CODEC, the device may first determine if the SNR of the communication channel is above a predetermined threshold. If the SNR is high enough, the video may be encoded at the lesser of the MBR and AS. If it below the predetermined threshold, it may initially be configured to a fraction of the lesser of the MBR and AS (e.g., 80%, which in this example would be 800 kbps). In some aspects, there are multiple thresholds at which the bitrate lowers further. For example, if the SNR was below a second predetermined threshold (lower than the first threshold), the CODEC may be configured to encode video at yet a smaller fraction of the lesser of the MBR and the AS (e.g., 50% (i.e., 500 kbps) in this example).

In another example, the MBR is 1000 kbps, and the AS is 800 kbps. In this example, the percentages may be the same as the previous example, but are relative to the AS of 800 kbps, since 800 kbps in that example would be the lesser of the MBR and the AS.

In order to adjust the received video bitrate in a two-way video call, the device may also transmit a temporary maximum media stream bitrate request (TMMBR) to the other device, requesting that it lower the bitrate at which it encodes video. After video begins to be transmitted and received, then traditional rate adaptation may be used to adjust the bitrate dynamically.

In another example, the initial bitrate may be determined by a combination of radio metrics. A device may look at, for example, both SNR and RSRP. A device may determine that if either of the two metrics drop below respective thresholds, then the bitrate should be lowered. In other aspects, the device may lower the bitrate only when both radio metrics fall below respective thresholds. In yet further aspects, the device may use a weighted sum of the metrics, which if the weighted sum falls below a predetermined threshold (e.g., a combined threshold between the various metrics), then the bitrate will be lowered.

Aspects of the present disclosure provide several benefits. For example the video as displayed may be less likely to freeze, jitter, or have mosaicking at the start of a video call. Further, by communicating a TMMBR to facilitate a modified received video bitrate, video quality may be improved in both directions of the video call. Additionally, network resources may be more efficiently used when lowering the bitrate. A device may also save power by encoding and decoding video at a lower bitrate.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer.

FIG. 1 illustrates a wireless communication network 100 according to some aspects of the present disclosure. The network 100 may be a 5G network, an LTE network, or any suitable cellular network and/or combinations thereof. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS fora macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a ULE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for sidelink communication, and for access to the network 100. A UE 115 may be able to communicate with other UEs 115 or wireless nodes, or any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, V2P, and/or C-V2X communications between a UE 115i, 115j, or 115k and other UEs 115, and/or vehicle-to-infrastructure (V2I) communications between a UE 115i, 115j, or 115k and one or more other wireless nodes, including through the use of sidelink communications in accordance with the present disclosure.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent sub carriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 (or UEs 115 or other wireless nodes, in sidelink communication scenarios) can assign or schedule transmission resources (e.g., in the form of time-frequency resource blocks (RB)) for downlink (DL) and uplink (UL) transmissions (or sidelink transmissions). DL may refer to the transmission direction from a BS 105 to a UE 115, whereas UL may refer to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 (or another UE or wireless node) to estimate a UL channel (or sidelink channel). Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. In some other aspects, the wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions (e.g., sidelink communications), among other examples.

The BSs 105 (or UEs 115 in sidelink communication) can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105 or from another wireless node in the network (e.g., another UE 115 in sidelink communication). The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the ULE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., bandwidth parts). A BS 105 may dynamically assign a UE 115 to operate over a certain BWP (e.g., a certain part of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

Although much of the description of the network 100 above is in the context of communication between UEs 115 and BSs 105, it will be understood that the mechanisms, elements, structures, and protocols described above can be performed between UEs 115 or wireless nodes in a sidelink communication scenario. For example, in some aspects, the radio frame structures, channels, signals, scheduling procedures, and/or connection techniques (e.g., HARQ) may be performed between ULEs 115/wireless nodes, rather than between a BS 105 and a UE 115.

Sidelink communications refers to the communications among user equipment devices (e.g., UEs 115$i$, 115$j$, 115$k$) without tunneling through a BS 105 and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS 105 and a UE 115, as described above. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH.

By utilizing sidelink communication, a UE 115 may communicate with another UE 115 independent of BS 105, and/or cooperate with another UE 115 to communicate with a BS 105. For example, the UEs 115 may communicate via a cooperative sidelink using unlicensed spectrum, which may ensure all licensed spectrum remains available to the network 100 (while, in other examples, licensed or a combination of licensed and unlicensed spectrum may be used). In this way network resources may be more fully utilized, and/or a UE 115 which has trouble reliably communicating with a BS 105 may use its resources to communicate via the cooperative UE 115 which may be a more reliable link.

A BS 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (e.g., by a transmitting device, such as a BS 105, or by a receiving device, such as UE 115) a beam direction for later transmission or reception by the BS 105. Some signals may be transmitted in a single beam direction (e.g., data associated with a particular receiving device). In some examples, the beam direction associated with transmissions along a single beam direction may be determined based on a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some examples, transmissions by a device (e.g., by a BS 105 or a UE 115) may be performed using multiple beam directions, and the device may use a combination of digital precoding or radio frequency beamforming to generate a combined beam for transmission (e.g., from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (e.g., a CRS, a CSI-RS, etc.), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the BS 105, such as synchronization signals, reference signals, beam selection signals, or other control signals. For example, a receiving device may try multiple receive directions by receiving via different antenna subarrays, by processing received signals according to different antenna sub arrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

Devices in network 100 may, in some aspects, may support video telephony (VT), which includes video calls between devices. For example, two UEs 115 may each record, encode, and stream video to each other through the network. The network may impose limitations on the UEs 115, such as a maximum bitrate (MBR) allocated for a video call, and/or an application-specific maximum bandwidth allocated to a specific application.

In some aspects, a UE 115 may measure radio metrics associated with a video call between itself and another UE 115. The UE 115 may determine, based on a received MBR, a received AS, and the radio metrics, an initial bitrate for a video call over the network 100 which is lower than the lesser of the MBR and the AS. Aspects of the present disclosure may also be performed between devices that are not part of network 100. For example, wired devices, or devices that use other wireless technologies.

Figure 2:
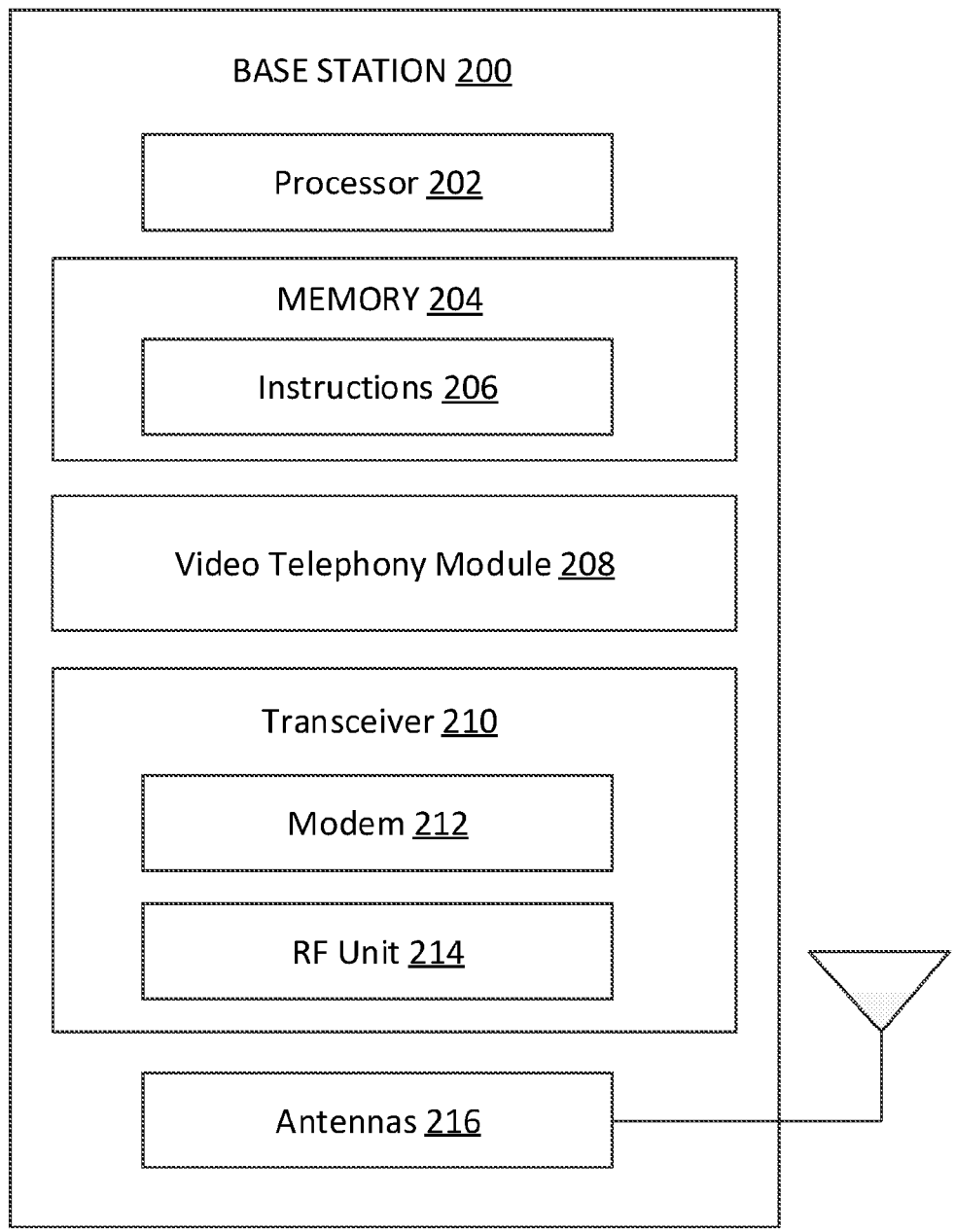
FIG. 2 is a block diagram of an exemplary base station according to some aspects of the present disclosure.

FIG. 2 is a block diagram of an exemplary BS 200 according to some aspects of the present disclosure. In some instances, the BS 200 may be a BS 105 in the network 100 as discussed above in FIG. 1. As shown, the BS 200 may include a processor 202, a memory 204, a video telephony module 208, a transceiver 210 including a modem subsystem 212 and a RF unit 214, and one or more antennas 216. These elements may be coupled with one another. The term "coupled" may refer to directly or indirectly coupled or connected to one or more intervening elements. For instance, these elements may be in direct or indirect communication with each other, for example via one or more buses.

The processor 202 may have various features as a specific-type processor. For example, these may include a CPU, a DSP, an ASIC, a controller, a FPGA device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 204 may include a non-transitory computer-readable medium. The memory 204 may store instructions 206. The instructions 206 may include instructions that, when executed by the processor 202, cause the processor 202 to perform operations described herein, for example, aspects of FIGS. 1-6. Instructions 206 may also be referred to as program code. The program code may be for causing a wireless communication device to perform these operations, for example by causing one or more processors (such as processor 202) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The video telephony module 208 may perform functions described with reference to the other figures herein. The video telephony module 208 may assist UEs 115 in performing a video call. For example, the telephony module 208 may establish a communication channel between two UEs 115 for a video call and indicate to each of the UEs 115 a maximum bitrate (MBR) allocated to them for the video call. The video telephony module 208 may also indicate an application-specific maximum bandwidth (AS) allocated to the UEs 115 associated with a specific application (e.g., the video call application). The video telephony module 208 may provide radio metric information to the UEs 115 such as channel measurements made at the BS 200. The video telephony module 208 may also transmit reference signals to the UEs 115 so that the receiving UEs 115 may make respective channel measurements.

As shown, the transceiver 210 may include the modem subsystem 212 and the RF unit 214. The transceiver 210 can be configured to communicate bi-directionally with other devices, such as the UEs 115 and/or another core network element. The modem subsystem 212 may be configured to modulate and/or encode data according to a MCS, e.g., a LDPC coding scheme, a turbo coding scheme, a convolutional coding scheme, a digital beamforming scheme, etc. The RF unit 214 may be configured to process (e.g., perform analog to digital conversion or digital to analog conversion, etc.) modulated/encoded data (e.g., video data) from the modem subsystem 212 (on outbound transmissions) or of transmissions originating from another source such as a UE 115. The RF unit 214 may be further configured to perform analog beamforming in conjunction with the digital beamforming. Although shown as integrated together in transceiver 210, the modem subsystem 212 and/or the RF unit 214 may be separate devices that are coupled together at the BS 105 to enable the BS 105 to communicate with other devices.

The RF unit 214 may provide the modulated and/or processed data, e.g. data packets (or, more generally, data messages that may contain one or more data packets and other information), to the antennas 216 for transmission to one or more other devices. The antennas 216 may further receive data messages transmitted from other devices and provide the received data messages for processing and/or demodulation at the transceiver 210. The transceiver 210 may provide the demodulated and decoded data (e.g., video data) to the video telephony module 208 for processing. The antennas 216 may include multiple antennas of similar or different designs in order to sustain multiple transmission links. In some aspects, the antennas 216 may be in the form of one or more antenna panels or one or more antenna arrays each including a plurality of antenna elements that can be selectively configured with different gains and/or phases to generate a beam for transmission and/or reception.

Figure 3:
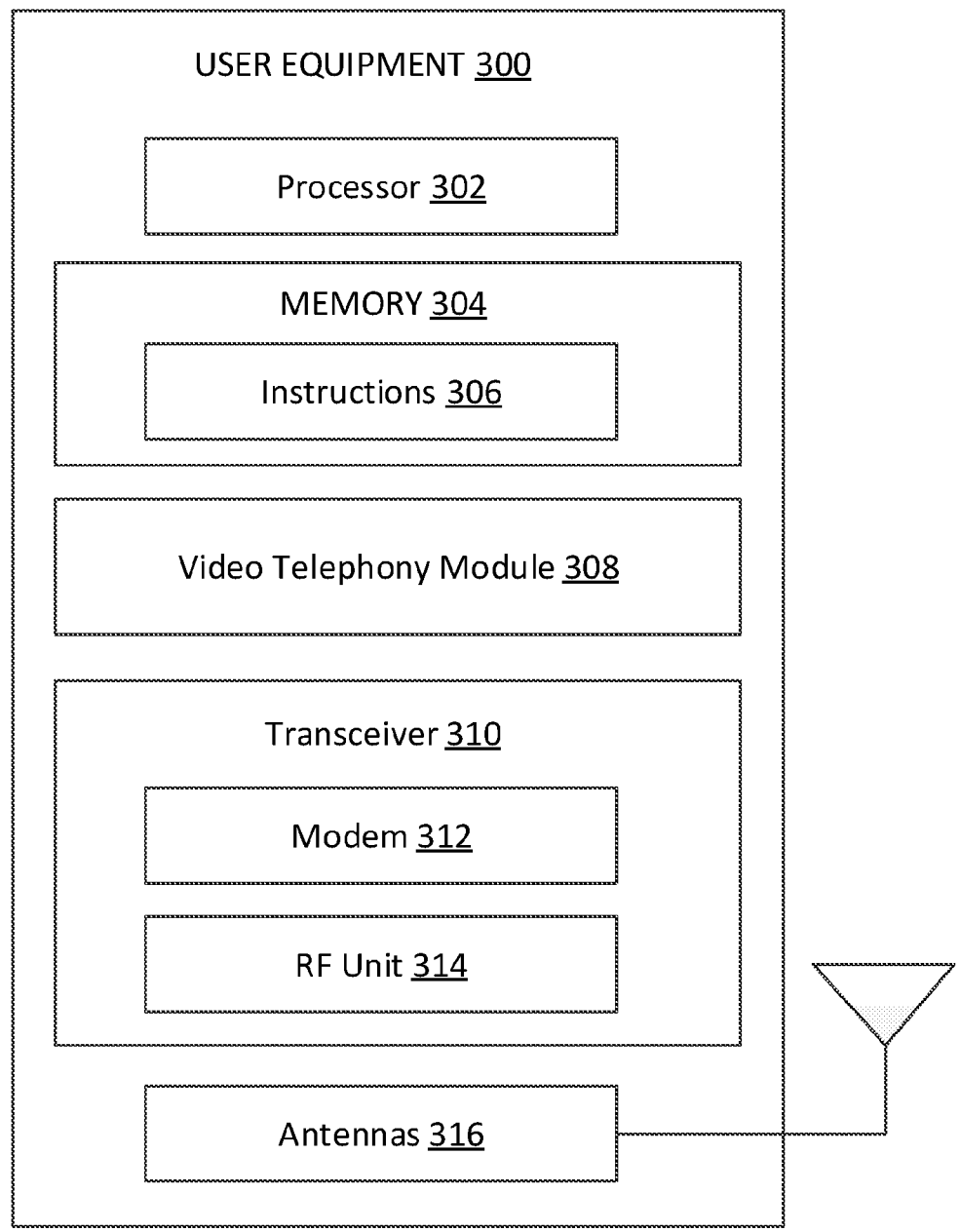
FIG. 3 is a block diagram of an exemplary user equipment according to some aspects of the present disclosure.

FIG. 3 is a block diagram of an exemplary UE 300 according to some aspects of the present disclosure. In some instances, the UE 300 may be a UE 115 as discussed above with respect to FIG. 1. As shown, the UE 300 may include a processor 302, a memory 304, a video telephony module 308, a transceiver 310 including a modem subsystem 312 and a radio frequency (RF) unit 314, and one or more antennas 316. These elements may be coupled with one another. The term "coupled" may refer to directly or indirectly coupled or connected to one or more intervening elements. For instance, these elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 304 includes a non-transitory computer-readable medium. The memory 304 may store, or have recorded thereon, instructions 306. The instructions 306 may include instructions that, when executed by the processor 302, cause the processor 302 to perform the operations described herein with reference to the UEs 115 in connection with aspects of the present disclosure, for example, aspects of FIGS. 1-6. Instructions 306 may also be referred to as program code, which may be interpreted broadly to include any type of computer-readable statement(s) as discussed above with respect to FIG. 2.

The video telephony module 308 may perform functions described with reference to the other figures herein. The video telephony module 308 may establish a video call with another UE 300 via a BS 105. The video telephony module 308 may receive from a BS 105 a MBR allocated for the video call. The video telephony module 208 may also receive from the BS 105 an AS allocated to the video call application. Measurements made may be made by the video telephony module 308 in order to determine radio metrics such as received signal strength indicator (RSSI), received signal received quality (RSRQ), received signal received power (RSRP), signal to noise ratio (SNR), power headroom (PHR), and block error rate (BER), for example on one or more reference signals transmitted by the BS 200 as noted with respect to FIGS. 1 and 2 above. The video telephony module 308 may also receive messages from a BS 105 indicating radio metrics.

Before transmitting and receiving video with another UE 300, the video telephony module may proactively configure the bitrate of video encoding to a value lower than the indicated MBR and AS. The determination of what bitrate to use may be based on the radio metrics discussed above. For example, the video telephony module 308 may determine that when SNR (or another radio metric) is below a predetermined threshold, the video bitrate should be reduced by a certain amount (e.g., to 80% of the MBR). In some aspects, there may be a number of thresholds with progressively lower bitrates. As an example, if the SNR goes below a first threshold, then the bitrate is set to 80% of the MBR, if it further goes below a second lower threshold, then the bitrate is set to 60% of the MBR, and if it further goes below a third lower threshold, then the bitrate is set to 40% of the MBR and so on. In another example, the video telephony module 308 may have different respective thresholds for multiple radio metrics, and if any of those radio metrics drops below (or goes above depending on the metric) their respective predetermined threshold, then the video bitrate is adjusted accordingly. Similarly, the video telephony module 308 may adjust the video bitrate only in response to all of the radio metrics passing respective thresholds. In yet another example, the video telephony module 308 determines an overall score which is based on a weighted sum of multiple radio metrics. When this score goes below a predetermined threshold, then the video telephony module 308 may reduce the video bitrate accordingly.

In addition to setting the bitrate of its own video CODEC, the video telephony module may also transmit a message to the other UE 300 (that is part of a video call) requesting that it transmit video at a lower bitrate. This message may, for example, be a temporary maximum media stream bitrate request (TMMBR). The video telephony module 308 may determine that the bitrate requested of the other UE 300 be the same as it determined for itself, or a different value (for example when the DL channel is poorer than the UL channel).

After determining the initial video bitrate, the video telephony module 308 may encode video and transmit it to the other UE 300 with which it is communicating. The video telephony module 308 may also receive and decode video. After transmitting and receiving video, the bitrate may be adapted dynamically using legacy methods based on the video streams.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304 and/or the video telephony module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data (e.g., video data) from the modem subsystem 312 (on outbound transmissions) or of transmissions originating from another source such as another UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 300 to enable the UE 300 to communicate with other devices.

The RF unit 314 may provide the modulated and/or processed data, e.g. data packets (or, more generally, data messages that may include one or more data packets and other information), to the antennas 316 for transmission to one or more other devices. The antennas 316 may further receive data messages transmitted from other devices. The antennas 316 may provide the received data messages for processing and/or demodulation at the transceiver 310. The transceiver 310 may provide the demodulated and decoded data (e.g., video data) to the video telephony module 308 for processing. The antennas 316 may include multiple antennas of similar or different designs in order to sustain multiple transmission links. The RF unit 314 may configure the antennas 316. In some aspects, the antennas 316 may be in the form of one or more antenna panels or one or more antenna arrays each including a plurality of antenna elements that can be selectively configured with different gains and/or phases to generate a beam for transmission and/or reception.

Figure 4:
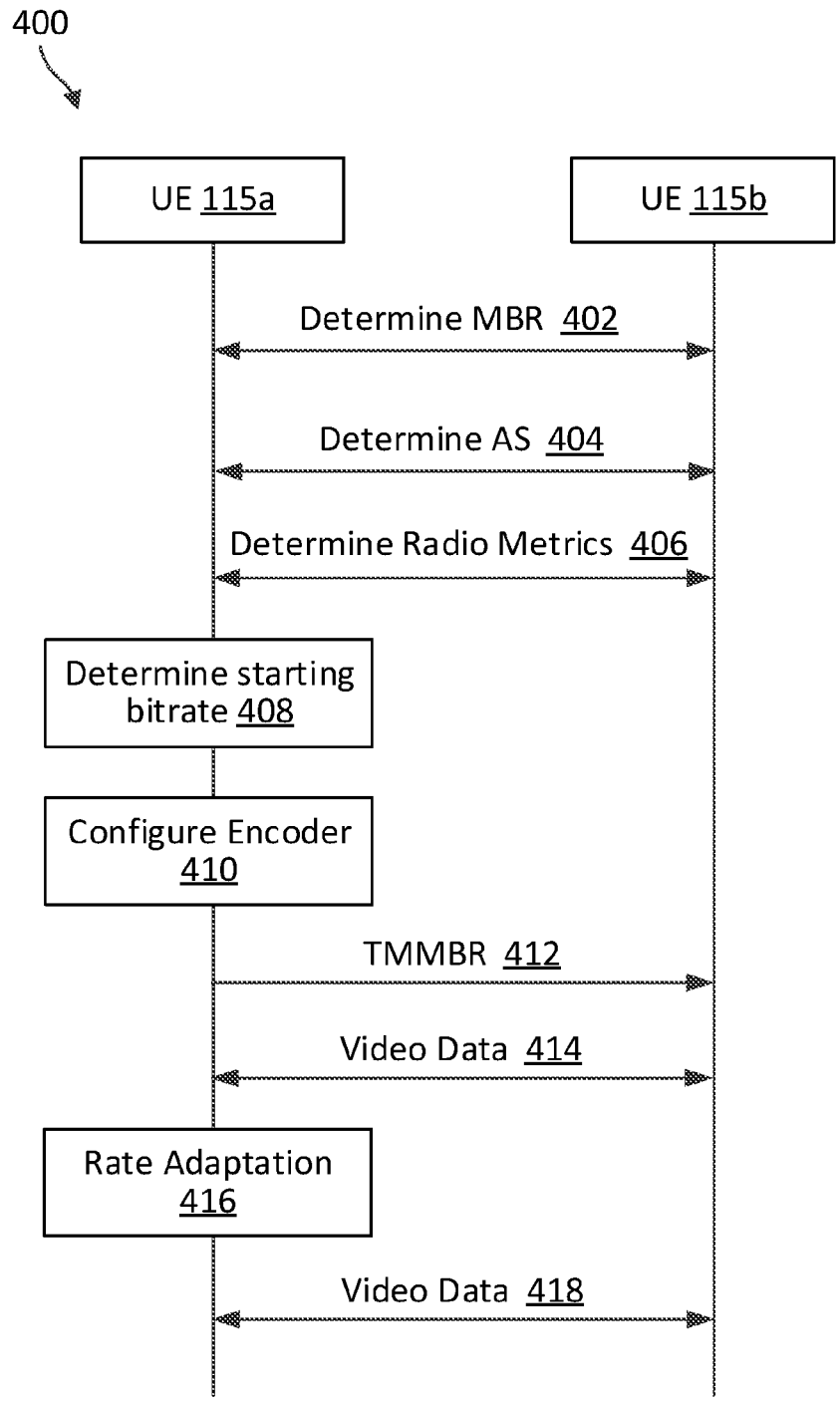
FIG. 4 is an exemplary communication protocol diagram according to some aspects of the present disclosure.

FIG. 4 is an exemplary communication protocol diagram 400, illustrating a method of proactive bitrate reduction. Aspects of the protocol diagram 400 may be performed by wireless networks, such as the network 100. Aspects of the protocol diagram may also be performed by other types of devices, including those utilizing wired communication. For simplicity of illustration and discussion, communication protocol diagram 400 includes two UEs 115, without illustrating the intermediary network.

In some aspects, the UEs 115 may utilize one or more components, such as the processor 302, the memory 304, the video telephony module 308, the transceiver 310, the modem 312, and the one or more antennas 316 shown in FIG. 3. As illustrated, the protocol diagram 400 includes a number of enumerated actions, but aspects of FIG. 4 may include additional actions before, after, and in between the enumerated actions. In some aspects, one or more of the enumerated actions may be omitted, combined together, or performed in a different order.

At action 402, UE 115a and UE 115b determine a maximum bitrate (MBR) for a video communication. This determination may be made as a negotiation between the devices and/or the network by which they are communicating may indicate the MBR (e.g., the network may communicate the MBR to the UEs 115a and/or 115b).

At action 404, UE 115a and UE 115b determine an application-specific maximum bandwidth (AS). In some aspects, the AS is a maximum bandwidth associated with a specific application (here, the video call). In some aspects, the AS is the same as the MBR.

At action 406, UE 115a and UE 115b determine radio metrics associated with the video communication channel. Measurements may be performed by UE 115a, UE 115b, or a network device such as a BS 105 in order to determine the radio metrics. UE 115a may receive a report from either UE 115b or a BS 105 indicating radio metrics determined by those devices. Examples of radio metrics determined at action 402 include: received signal strength indicator (RSSI), received signal received quality (RSRQ), received signal received power (RSRP), signal to noise ratio (SNR), power headroom (PHR), and block error rate (BER).

At action 408, UE 115a determines a starting bitrate for encoding video. The determination may be based on the radio metrics determined at action 406. For example, ULE 115a may determine that when SNR (or another radio metric) is below a predetermined threshold, the video bitrate should be reduced by a certain amount (e.g., to 80% of the lesser of the MBR and the AS). In some aspects, there may be a number of thresholds with progressively lower bitrates. As an example, if SNR goes below a first threshold, then the bitrate is set to 80% of the lesser of the MBR and the AS, if it further goes below a second lower threshold, then the bitrate is set to 60% of the lesser of the MBR and the AS, and if it further goes below a third lower threshold, then the bitrate is set to 40% of the lesser of the MBR and the AS and so on. In another example, UE 115a may have different respective thresholds for multiple radio metrics, and if any of those radio metrics drops below (or goes above depending on the metric) their respective predetermined threshold, then the video bitrate is adjusted accordingly. In another example, UE 115a may adjust the video bitrate only when each of the radio metrics drops below a respective predetermined threshold. In yet another example, UE 115a determines an overall score which is based on a weighted sum of multiple radio metrics. When this score goes below a predetermined threshold, then UE 115a may reduce the video bitrate accordingly.

At action 410, UE 115a configures the video encoder based on the bitrate determined at action 408. The framerate, resolution, or other characteristics of the encoded video may be adjusted so that the encoder meets the configured bitrate.

At action 412, UE 115a communicates a temporary maximum media stream bitrate request (TMMBR) to UE 115b. The TMMBR indicates a requested bitrate for UE 115b to use in encoding video to be sent to UE 115a. The bitrate indicated in the TMMBR may also be determined based on the radio metrics as described with respect to action 408. The bitrate requested in the TMMBR may be the same bitrate as was used to configure the encoder at action 410 or may be different. In some aspects, this action is omitted, and UE 115a receives video data from UE 115b at the bitrate determined by UE 115b.

At action 414, video data is communicated between UE 115a and UE 11b at the determined bitrates.

At action 416, UE 115a may perform rate adaptation in order to adjust the bitrate further based on the performance of the communication of the actual video data.

At action 418, video data may continue to be communicated between UE 115a and UE 115b at the updated bitrates.

Figure 5:
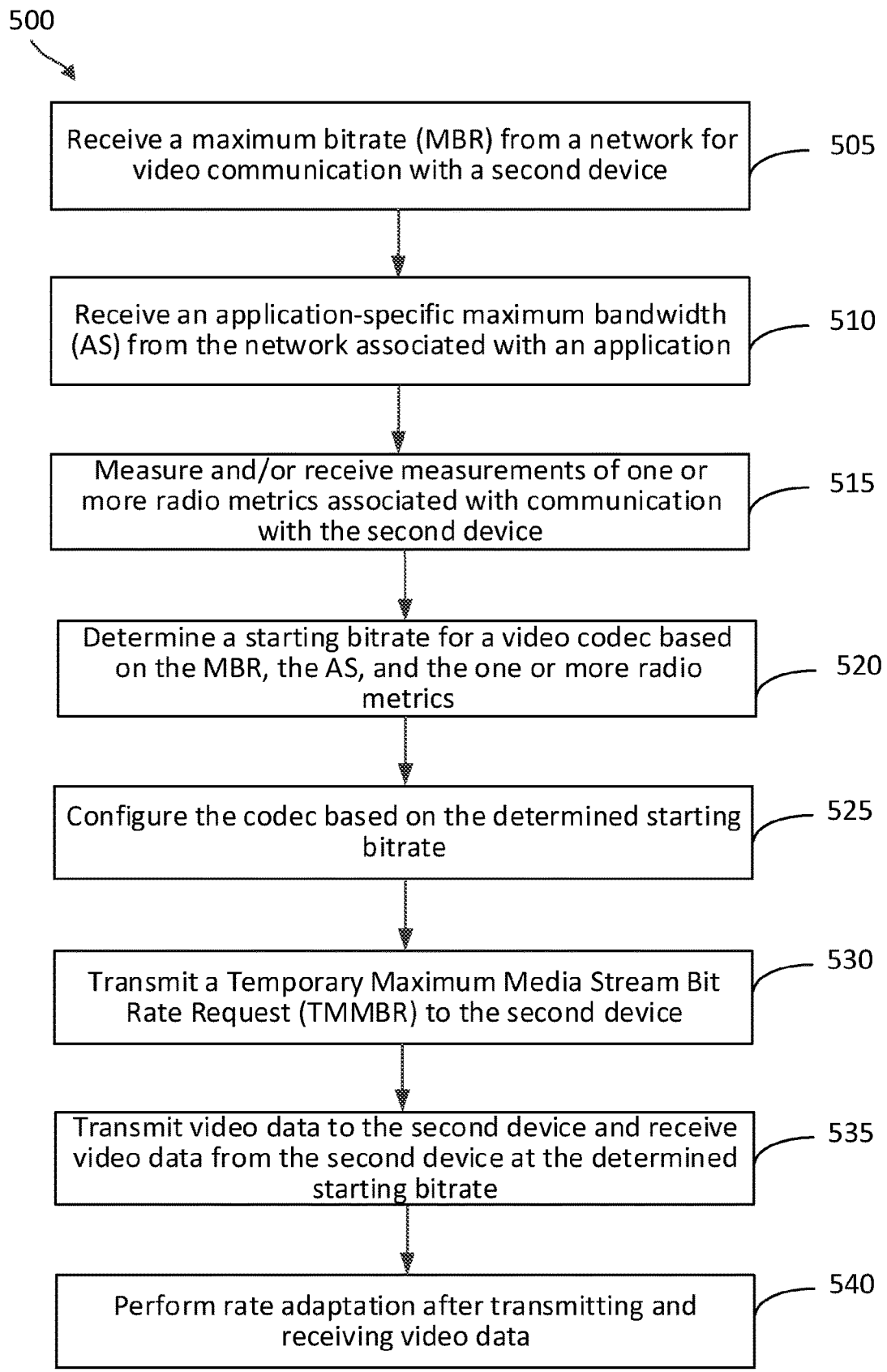
FIGS. 5-6 are exemplary flow diagrams according to some aspects of the present disclosure.

FIG. 5 is an exemplary flow diagram, illustrating a method 500 according to some aspects of the present disclosure. Aspects of the method 500 can be executed by a computing device (e.g., a processor, processing circuit, and/or other suitable component) of a wireless communication device or other suitable means for performing the steps. For example, a UE (e.g., UE 115 of FIG. 1) may utilize one or more components, such as the processor 302, the memory 304, the video telephony module 308, the transceiver 310, the modem 312, and the one or more antennas 316 shown in FIG. 3. As illustrated, the method 500 includes a number of enumerated steps, but aspects of the method 500 may include additional steps before, after, and in between the enumerated steps. In some aspects, one or more of the enumerated steps may be omitted or performed in a different order.

At block 505, a first device receives a maximum bitrate (MBR) from a network for video communication with a second device.

At block 510, the first device receives an application-specific maximum bandwidth (AS) from the network associated with an application. In some aspects, the application is the video call application. The AS may be the same as the MBR, but also may be higher or lower. Further, blocks 505 and 510 may occur at the same time, block 505 before block 510, or block 510 before block 505, without departing from the scope of the present disclosure.

At block 515, the first device measures and/or receives measurements of one or more radio metrics associated with communication with the second device. Measurements may be performed by the first device, the second device, or a network device in order to determine the radio metrics. The first device may receive a report from either the second device or a network device indicating radio metrics determined by those devices. Examples of radio metrics determined at block 515 include: received signal strength indicator (RSSI), received signal received quality (RSRQ), received signal received power (RSRP), signal to noise ratio (SNR), power headroom (PHR), and block error rate (BER).

At block 520, the first device determines a starting bitrate for a video codec based on the MBR, the AS, and the one or more radio metrics. As discussed with respect to action 408 of FIG. 4, the determination may be based on a single radio metric passing a predetermined threshold, one of multiple radio metrics passing a respective predetermined threshold, or a score based on a weighted sum of multiple radio metrics passing a predetermined threshold. Other methods of bitrate determination based on one ore more radio metrics may also be used by the first device.

At block 525, the first device configures the codec to encode video based on the determined starting bitrate.

At block 530, the first device transmits a temporary maximum media stream bit rate request (TMMBR) to the second device. The TMMBR indicates a requested bitrate for the second device to use in encoding video to be sent to the first device. The bitrate indicated in the TMMBR may also be determined based on the radio metrics as described with respect to block 520. The bitrate requested in the TMMBR may be the same bitrate as was used to configure the encoder at block 525, or may be different. In some aspects, this action is omitted, and the first device receives video data from the second device at the bitrate determined by the second device.

At block 535, the first device transmits video data to the second device and receives video data from the second device at the determined starting bitrates.

At block 540, the first device performs rate adaptation after transmitting and receiving video data.

Figure 6:
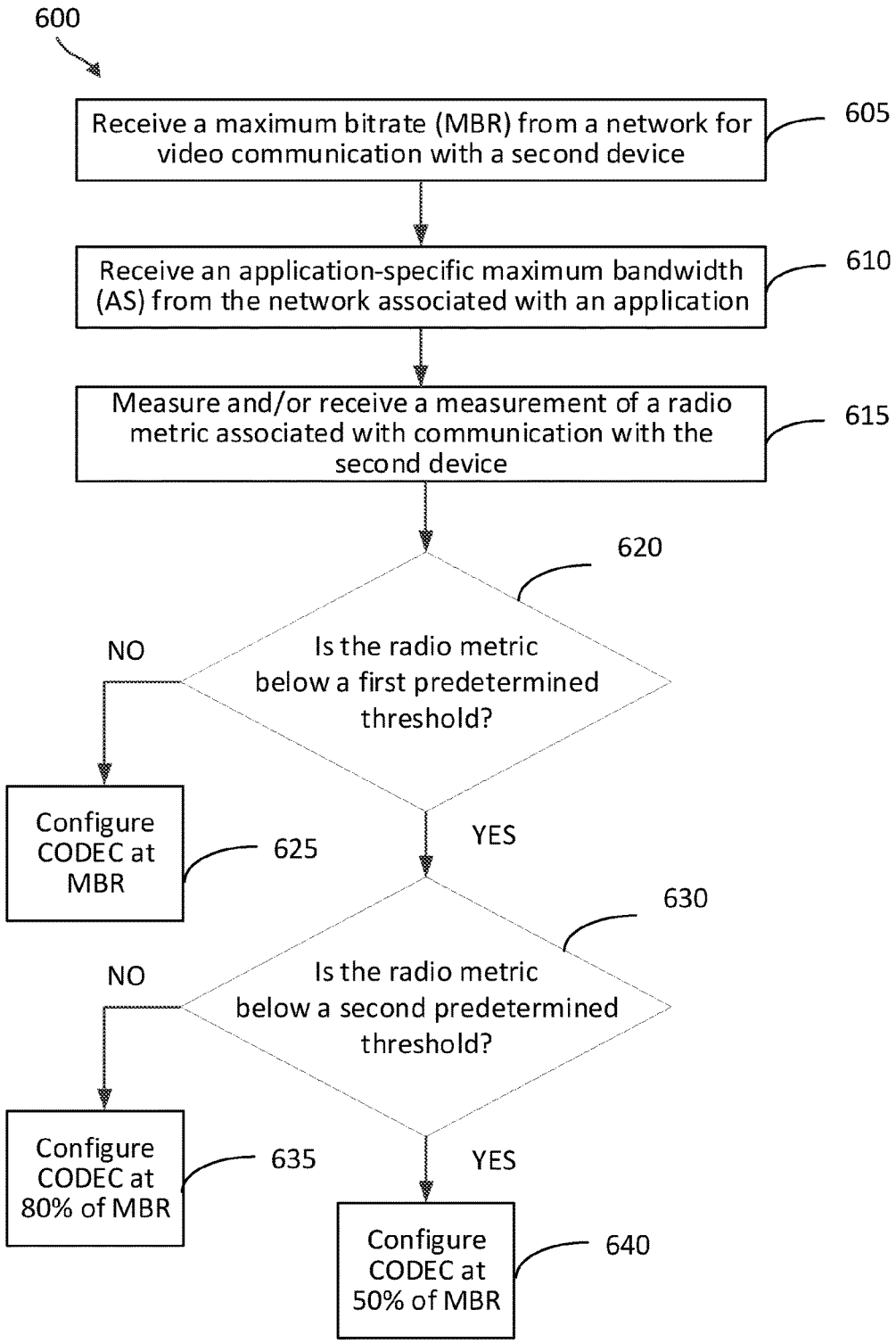

FIG. 6 is an exemplary flow diagram, illustrating a method 600. Method 600 is an example of one method by which a proactive bitrate may be determined according to some aspects of the present disclosure. Aspects of the method 600 can be executed by a computing device (e.g., a processor, processing circuit, and/or other suitable component) of a wireless communication device or other suitable means for performing the steps. For example, a UE (e.g., UE 115 of FIG. 1) may utilize one or more components, such as the processor 302, the memory 304, the video telephony module 308, the transceiver 310, the modem 312, and the one or more antennas 316 shown in FIG. 3. As illustrated, the method 600 includes a number of enumerated steps, but aspects of the method 600 may include additional steps before, after, and in between the enumerated steps. In some aspects, one or more of the enumerated steps may be omitted or performed in a different order.

Blocks 605, 610, and 615 are performed the same as blocks 505 and 515 described with respect to FIG. 5.

At decision block 620, the first device determines whether a radio metric is below a first predetermined threshold. For example, the first device may determine whether RSRQ is less than −10 dB. If the radio metric is not below the predetermined threshold, then method 600 continues to block 625 where it configures the CODEC at the lesser of the MBR and the AS. Otherwise, if the radio metric is below the predetermined threshold (e.g., if RSRQ is less than −10 dB), then method 600 continues to decision block 630.

At decision block 630, the first device determines whether the radio metric is below a second predetermined threshold. For example, the first device may determine whether RSRQ is less than −15 dB. If the radio metric is not below the predetermined threshold, then method 600 continues to block 635 where it configures the CODEC at a percentage of the lesser of the MBR and the AS (e.g., 80%). Otherwise, if the radio metric is below the predetermined threshold (e.g., if RSRQ is less than −15 dB), then method 600 continues to block 640 where it configures the CODEC at an even lower percentage of the lesser of the MBR and the AS (e.g. 50%).

The present disclosure also includes the following aspects:

Aspect 1. A method of wireless communication, comprising:
  receiving, by a first wireless communication device, an indication of a maximum bit rate (MBR) associated with a communication channel;
  receiving, by the first wireless communication device, an indication of an application-specific maximum bandwidth (AS) associated with an application;
  measuring, by the first wireless communication device, a radio metric associated with the communication channel;
  configuring, by the first wireless communication device before transmitting a video data, an encoder with a transmit bit rate lower than the MBR and lower than the AS based on the radio metric; and
  transmitting, by the first wireless communication device to a second wireless communication device, the video data at the transmit bit rate.

Aspect 2. The method of aspect 1, wherein the radio metric comprises at least one of: received signal strength indicator (RSSI), received signal received quality (RSRQ), received signal received power (RSRP), signal to noise ratio (SNR), power headroom (PHR), or block error rate (BER).

Aspect 3. The method of any of aspects 1-2, wherein the configuring is based on the radio metric passing a predetermined threshold.

Aspect 4. The method of any of aspects 1-3, wherein the transmit bit rate is configured to a first value based on the radio metric passing a first predetermined threshold, but not passing a second predetermined threshold, and a second value based on the radio metric passing both the first predetermined threshold and the second predetermined threshold.

Aspect 5. The method of any of aspects 1-3, wherein:
 the radio metric comprises a first radio metric, and
 the configuring is based on a weighted sum of the first radio metric and a second radio metric passing a predetermined threshold.

Aspect 6. The method of any of aspects 1-3, wherein:
 the radio metric comprises a first radio metric, and
 the configuring is based on either of the first radio metric or the second radio metric passing a respective predetermined threshold.

Aspect 7. The method of any of aspects 1-6, further comprising:
 transmitting, by the first wireless communication device to the second wireless communication device before the transmitting the video data, a temporary maximum media stream bitrate request (TMMBR) indicating a receive bit rate lower than the MBR and lower than the AS.

Aspect 8. The method of aspect 7, further comprising:
 receiving, by the first wireless communication device from the second wireless communication device, a second video data at the receive bit rate.

Aspect 9. A first wireless communication device, comprising:
 a transceiver configured to:
  receive an indication of a maximum bit rate (MBR) associated with a communication channel;
  receive an indication of an application-specific maximum bandwidth (AS) associated with an application; and
  measure a radio metric associated with the communication channel; and
 a processor configured to:
  configure, before transmitting a video data, an encoder with a transmit bit rate lower than the MBR and lower than the AS based on the radio metric; and
 the transceiver further configured to:
  transmit, to a second wireless communication device, the video data at the transmit bit rate.

Aspect 10. The first wireless communication device of aspect 9, wherein the radio metric comprises at least one of: received signal strength indicator (RSSI), received signal received quality (RSRQ), received signal received power (RSRP), signal to noise ratio (SNR), power headroom (PHR), or block error rate (BER).

Aspect 11. The first wireless communication device of any of aspects 9-10, wherein the configuring is based on the radio metric passing a predetermined threshold.

Aspect 12. The first wireless communication device of any of aspects 9-11, wherein the transmit bit rate is configured to a first value based on the radio metric passing a first predetermined threshold, but not passing a second predetermined threshold, and a second value based on the radio metric passing both the first predetermined threshold and the second predetermined threshold.

Aspect 13. The first wireless communication device of any of aspects 9-11, wherein:
 the radio metric comprises a first radio metric, and
 the configuring is based on a weighted sum of the first radio metric and a second radio metric passing a predetermined threshold.

Aspect 14. The first wireless communication device of any of aspects 9-11, wherein:
 the radio metric comprises a first radio metric, and
 the configuring is based on either of the first radio metric or the second radio metric passing a respective predetermined threshold.

Aspect 15. The first wireless communication device of any of aspects 9-14, wherein the transceiver is further configured to:
 transmit, to the second wireless communication device before the transmitting the video data, a temporary maximum media stream bitrate request (TMMBR) indicating a receive bit rate lower than the MBR and lower than the AS.

Aspect 16. The first wireless communication device of aspect 15, wherein the transceiver is further configured to:
 receive, from the second wireless communication device, a second video data at the receive bit rate.

Aspect 17. A non-transitory computer-readable medium having program code recorded thereon, the program code comprising:
 code for causing a first wireless communication device to receive an indication of a maximum bit rate (MBR) associated with a communication channel;
 code for causing the first wireless communication device to receive an indication of an application-specific maximum bandwidth (AS) associated with an application;
 code for causing the first wireless communication device to measure a radio metric associated with the communication channel;
 code for causing the first wireless communication device to configure, before transmitting a video data, an encoder with a transmit bit rate lower than the MBR and lower than the AS based on the radio metric; and
 code for causing the first wireless communication device to transmit, to a second wireless communication device, the video data at the transmit bit rate.

Aspect 18. The non-transitory computer-readable medium of aspect 17, wherein the radio metric comprises at least one of: received signal strength indicator (RSSI), received signal received quality (RSRQ), received signal received power (RSRP), signal to noise ratio (SNR), power headroom (PHR), or block error rate (BER).

Aspect 19. The non-transitory computer-readable medium of any of aspects 17-18, wherein the configuring is based on the radio metric passing a predetermined threshold.

Aspect 20. The non-transitory computer-readable medium of any of aspects 17-19, wherein the transmit bit rate is configured to a first value based on the radio metric passing a first predetermined threshold, but not passing a second predetermined threshold, and a second value based on the radio metric passing both the first predetermined threshold and the second predetermined threshold.

Aspect 21. The non-transitory computer-readable medium of any of aspects 17-19, wherein:
the radio metric comprises a first radio metric, and
the configuring is based on a weighted sum of the first radio metric and a second radio metric passing a predetermined threshold.

Aspect 22. The non-transitory computer-readable medium of any of aspects 17-19, wherein:
the radio metric comprises a first radio metric, and
the configuring is based on either of the first radio metric or the second radio metric passing a respective predetermined threshold.

Aspect 23. The non-transitory computer-readable medium of any of aspects 17-22, further comprising:
code for causing the first wireless communication device to transmit, to the second wireless communication device before the transmitting the video data, a temporary maximum media stream bitrate request (TMMBR) indicating a receive bit rate lower than the MBR and lower than the AS.

Aspect 24. The non-transitory computer-readable medium of aspect 23, further comprising:
code for causing the first wireless communication device to receive, from the second wireless communication device, a second video data at the receive bit rate.

Aspect 25. A first wireless communication device, comprising:
means for receiving, by a first wireless communication device, an indication of a maximum bit rate (MBR) associated with a communication channel;
means for receiving an indication of an application-specific maximum bandwidth (AS) associated with an application;
means for measuring, by the first wireless communication device, a radio metric associated with the communication channel;
means for configuring, by the first wireless communication device before transmitting a video data, an encoder with a transmit bit rate lower than the MBR and lower than the AS based on the radio metric; and
means for transmitting, by the first wireless communication device to a second wireless communication device, the video data at the transmit bit rate.

Aspect 26. The first wireless communication device of aspect 25, wherein the radio metric comprises at least one of: received signal strength indicator (RSSI), received signal received quality (RSRQ), received signal received power (RSRP), signal to noise ratio (SNR), power headroom (PHR), or block error rate (BER).

Aspect 27. The first wireless communication device of any of aspects 25-26, wherein the transmit bit rate is configured to a first value based on the radio metric passing a first predetermined threshold, but not passing a second predetermined threshold, and a second value based on the radio metric passing both the first predetermined threshold and the second predetermined threshold.

Aspect 28. The first wireless communication device of any of aspects 25-26, wherein:
the radio metric comprises a first radio metric, and
the configuring is based on a weighted sum of the first radio metric and a second radio metric passing a predetermined threshold.

Aspect 29. The first wireless communication device of any of aspects 25-26, wherein:
the radio metric comprises a first radio metric, and
the configuring is based on either of the first radio metric or the second radio metric passing a respective predetermined threshold.

Aspect 30. The first wireless communication device of any of aspects 25-29, further comprising:
means for transmitting, by the first wireless communication device to the second wireless communication device before the transmitting the video data, a temporary maximum media stream bitrate request (TMMBR) indicating a receive bit rate lower than the MBR and lower than the AS.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). The terms "about" or "approximately" may be used to denote a range of +/−2%, unless specified otherwise.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:
1. A method of wireless communication, comprising:
receiving, by a first wireless communication device, an indication of a maximum bit rate (MBR) allocated for transmitting video data over a communication channel;

receiving, by the first wireless communication device, an indication of an application-specific maximum bandwidth (AS) allocated to an application;
measuring, by the first wireless communication device, a radio metric associated with the communication channel;
configuring, by the first wireless communication device before transmitting the video data, an encoder with an initial transmit bit rate based on the MBR, the AS, and the radio metric, wherein the initial transmit bit rate is lower than the MBR and lower than the AS; and
initiating transmission of the video data, by the first wireless communication device to a second wireless communication device, at the initial transmit bit rate.

2. The method of claim 1,
wherein the radio metric comprises at least one of: received signal strength indicator (RSSI), received signal received quality (RSRQ), received signal received power (RSRP), signal to noise ratio (SNR), power headroom (PHR), or block error rate (BER).

3. The method of claim 1,
wherein the configuring is based on the radio metric passing a predetermined threshold.

4. The method of claim 3,
wherein the initial transmit bit rate is configured to a first value based on the radio metric passing a first predetermined threshold, but not passing a second predetermined threshold, and a second value based on the radio metric passing both the first predetermined threshold and the second predetermined threshold.

5. The method of claim 1, wherein:
the radio metric comprises a first radio metric, and
the configuring is based on a weighted sum of the first radio metric and a second radio metric passing a predetermined threshold.

6. The method of claim 1, wherein:
the radio metric comprises a first radio metric, and
the configuring is based on either of the first radio metric or a second radio metric passing a respective predetermined threshold.

7. The method of claim 1, further comprising:
transmitting, by the first wireless communication device to the second wireless communication device before the transmitting the video data, a temporary maximum media stream bitrate request (TMMBR) indicating a receive bit rate lower than the MBR and lower than the AS.

8. The method of claim 7, further comprising:
receiving, by the first wireless communication device from the second wireless communication device, a second video data at the receive bit rate.

9. A first wireless communication device, comprising:
a transceiver configured to:
receive, from a network—an indication of a maximum bit rate (MBR) allocated for transmitting video data over a communication channel;
receive an indication of an application-specific maximum bandwidth (AS) allocated to an application; and
measure a radio metric associated with the communication channel; and
a processor configured to:
configure, before transmitting the video data, an encoder with an initial transmit bit rate based on the MBR, the AS, and the radio metric, wherein the initial transmit bit rate is lower than the MBR and lower than the AS; and the transceiver further configured to:
initiate transmission of the video data, to a second wireless communication device, at the initial transmit bit rate.

10. The first wireless communication device of claim 9,
wherein the radio metric comprises at least one of: received signal strength indicator (RSSI), received signal received quality (RSRQ), received signal received power (RSRP), signal to noise ratio (SNR), power headroom (PHR), or block error rate (BER).

11. The first wireless communication device of claim 9,
wherein the configuring is based on the radio metric passing a predetermined threshold.

12. The first wireless communication device of claim 11,
wherein the initial transmit bit rate is configured to a first value based on the radio metric passing a first predetermined threshold, but not passing a second predetermined threshold, and a second value based on the radio metric passing both the first predetermined threshold and the second predetermined threshold.

13. The first wireless communication device of claim 9, wherein:
the radio metric comprises a first radio metric, and
the configuring is based on a weighted sum of the first radio metric and a second radio metric passing a predetermined threshold.

14. The first wireless communication device of claim 9, wherein:
the radio metric comprises a first radio metric, and
the configuring is based on either of the first radio metric or a second radio metric passing a respective predetermined threshold.

15. The first wireless communication device of claim 9,
wherein the transceiver is further configured to:
transmit, to the second wireless communication device before the transmitting the video data, a temporary maximum media stream bitrate request (TMMBR) indicating a receive bit rate lower than the MBR and lower than the AS.

16. The first wireless communication device of claim 15,
wherein the transceiver is further configured to:
receive, from the second wireless communication device, a second video data at the receive bit rate.

17. A non-transitory computer-readable medium having program code recorded thereon, the program code comprising:
code for causing a first wireless communication device to receive an indication of a maximum bit rate (MBR) allocated for transmitting video data over a communication channel;
code for causing the first wireless communication device to receive an indication of an application-specific maximum bandwidth (AS) allocated to an application;
code for causing the first wireless communication device to measure a radio metric associated with the communication channel;
code for causing the first wireless communication device to configure, before transmitting the video data, an encoder with an initial transmit bit rate based on the MBR, the AS, and the radio metric, wherein the initial transmit bit rate is lower than the MBR and lower than the AS; and
code for causing the first wireless communication device to initiate transmission of the video data, to a second wireless communication device, at the initial transmit bit rate.

18. The non-transitory computer-readable medium of claim 17,
wherein the radio metric comprises at least one of: received signal strength indicator (RSSI), received signal received quality (RSRQ), received signal received power (RSRP), signal to noise ratio (SNR), power headroom (PHR), or block error rate (BER).

19. The non-transitory computer-readable medium of claim 17,
wherein the configuring is based on the radio metric passing a predetermined threshold.

20. The non-transitory computer-readable medium of claim 19,
wherein the initial transmit bit rate is configured to a first value based on the radio metric passing a first predetermined threshold, but not passing a second predetermined threshold, and a second value based on the radio metric passing both the first predetermined threshold and the second predetermined threshold.

21. The non-transitory computer-readable medium of claim 17, wherein:
the radio metric comprises a first radio metric, and
the configuring is based on a weighted sum of the first radio metric and a second radio metric passing a predetermined threshold.

22. The non-transitory computer-readable medium of claim 17, wherein:
the radio metric comprises a first radio metric, and
the configuring is based on either of the first radio metric or a second radio metric passing a respective predetermined threshold.

23. The non-transitory computer-readable medium of claim 17, further comprising:
code for causing the first wireless communication device to transmit, to the second wireless communication device before the transmitting the video data, a temporary maximum media stream bitrate request (TMMBR) indicating a receive bit rate lower than the MBR and lower than the AS.

24. The non-transitory computer-readable medium of claim 23, further comprising:
code for causing the first wireless communication device to receive, from the second wireless communication device, a second video data at the receive bit rate.

25. An apparatus, comprising:
means for receiving an indication of a maximum bit rate (MBR) allocated for transmitting video data over a communication channel;
means for receiving an indication of an application-specific maximum bandwidth (AS) allocated to an application;
means for measuring a radio metric associated with the communication channel;
means for configuring, before transmitting the video data, an encoder with an initial transmit bit rate based on the MBR, the AS, and the radio metric, wherein the initial transmit bit rate is lower than the MBR and lower than the AS; and
means for initiating transmission of the video data to a second wireless communication device, at the initial transmit bit rate.

26. The apparatus of claim 25,
wherein the radio metric comprises at least one of: received signal strength indicator (RSSI), received signal received quality (RSRQ), received signal received power (RSRP), signal to noise ratio (SNR), power headroom (PHR), or block error rate (BER).

27. The apparatus of claim 25,
wherein the initial transmit bit rate is configured to a first value based on the radio metric passing a first predetermined threshold, but not passing a second predetermined threshold, and a second value based on the radio metric passing both the first predetermined threshold and the second predetermined threshold.

28. The apparatus of claim 25, wherein:
the radio metric comprises a first radio metric, and
the configuring is based on a weighted sum of the first radio metric and a second radio metric passing a predetermined threshold.

29. The apparatus of claim 25, wherein:
the radio metric comprises a first radio metric, and
the configuring is based on either of the first radio metric or a second radio metric passing a respective predetermined threshold.

30. The apparatus of claim 25, further comprising:
means for transmitting, by the first wireless communication device to the second wireless communication device before the transmitting the video data, a temporary maximum media stream bitrate request (TMMBR) indicating a receive bit rate lower than the MBR and lower than the AS.

* * * * *